US011862004B2

(12) United States Patent
Rao et al.

(10) Patent No.: US 11,862,004 B2
(45) Date of Patent: Jan. 2, 2024

(54) METHODS AND SYSTEMS FOR DISABLING SLEEP ALARM BASED ON AUTOMATED WAKE DETECTION

(71) Applicant: Apple Inc., Cupertino, CA (US)

(72) Inventors: Bharath Narasimha Rao, Sunnyvale, CA (US); Kevin Will Chen, Sunnyvale, CA (US); Reed E. Olsen, San Jose, CA (US); Umamahesh Srinivas, Milpitas, CA (US); Kevin M. Lynch, Woodside, CA (US); John-Peter E. Cafaro, La Jolla, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/514,210

(22) Filed: Oct. 29, 2021

(65) Prior Publication Data

US 2022/0051549 A1 Feb. 17, 2022

Related U.S. Application Data

(63) Continuation of application No. 17/013,184, filed on Sep. 4, 2020, now Pat. No. 11,189,159, which is a (Continued)

(51) Int. Cl.
*G08B 25/00* (2006.01)
*G04G 21/02* (2010.01)
(Continued)

(52) U.S. Cl.
CPC ......... *G08B 25/008* (2013.01); *G04G 13/021* (2013.01); *G04G 21/025* (2013.01); *G08B 21/182* (2013.01)

(58) Field of Classification Search
CPC .. G08B 25/008; G08B 21/182; G04G 13/021; G04G 21/025
See application file for complete search history.

(56) References Cited

U.S. PATENT DOCUMENTS 6,477,117 B1 11/2002 Narayanaswami et al.
6,605,038 B1 8/2003 Teller et al.
(Continued)

FOREIGN PATENT DOCUMENTS

CN 1889045 A 1/2007
CN 101394787 A 3/2009
(Continued)

OTHER PUBLICATIONS

US 10,681,203 B2, 06/2020, Ma et al. (withdrawn)
(Continued)

*Primary Examiner* — Hongmin Fan
(74) *Attorney, Agent, or Firm* — Kilpatrick Townsend & Stockton LLP

(57) ABSTRACT

Techniques are disclosed for facilitating disabling an alarm in response to particular types of activity-indicative data. More specifically, activity-indicative data (e.g., sensor data or input(s) can be detected prior to a preset alarm time. Upon determining, based on the activity-indicative data, that a wakefulness condition is satisfied (e.g., that the activity-indicative data corresponds to one or more predefined characteristics), a disablement query can be displayed that includes an option to disable the alarm. In response to detecting a selection of the option, the alarm can be disabled such that the alarm stimuli is not to be presented at the preset alarm time.

20 Claims, 6 Drawing Sheets

Related U.S. Application Data continuation of application No. 16/380,122, filed on Apr. 10, 2019, now Pat. No. 10,854,066.

(60) Provisional application No. 62/656,847, filed on Apr. 12, 2018.

(51) Int. Cl.
*G04G 13/02* (2006.01)
*G08B 21/18* (2006.01)

(56) References Cited

U.S. PATENT DOCUMENTS

| | | | |
|---|---|---|---|
| 7,130,664 | B1 | 10/2006 | Williams |
| 7,221,331 | B2 | 5/2007 | Bear et al. |
| 7,715,873 | B1 | 5/2010 | Biere et al. |
| 8,233,918 | B2 | 7/2012 | Roin et al. |
| 8,299,902 | B1 | 10/2012 | Roka et al. |
| 8,306,514 | B1 | 11/2012 | Nunally |
| 8,350,681 | B2 | 1/2013 | Bells |
| 8,483,665 | B2 | 7/2013 | Kissinger et al. |
| 8,548,431 | B2 | 10/2013 | Teng et al. |
| 8,614,431 | B2 | 12/2013 | Huppi et al. |
| 9,019,106 | B2 | 4/2015 | Mohsen |
| 9,049,572 | B2 | 6/2015 | Kissinger et al. |
| 9,210,566 | B2 | 12/2015 | Ziemianska et al. |
| 9,641,669 | B2 | 5/2017 | Ziemianska et al. |
| 9,668,657 | B2 | 6/2017 | Takahashi |
| 10,447,844 | B2 | 10/2019 | Ma et al. |
| 10,742,797 | B2 | 8/2020 | Ma et al. |
| 2002/0004672 | A1 | 1/2002 | Florio et al. |
| 2003/0139138 | A1 | 7/2003 | Cho et al. |
| 2004/0145493 | A1 | 7/2004 | O'Connor et al. |
| 2005/0154935 | A1 | 7/2005 | Jin |
| 2005/0172311 | A1 | 8/2005 | Hjelt et al. |
| 2007/0043687 | A1 | 2/2007 | Bodart et al. |
| 2008/0165022 | A1 | 7/2008 | Herz et al. |
| 2008/0287134 | A1 | 11/2008 | Catovic et al. |
| 2008/0303681 | A1 | 12/2008 | Herz et al. |
| 2008/0319279 | A1 | 12/2008 | Ramsay et al. |
| 2009/0156172 | A1 | 6/2009 | Chan |
| 2009/0182560 | A1 | 7/2009 | White |
| 2009/0186633 | A1 | 7/2009 | Yonker et al. |
| 2010/0052930 | A1 | 4/2010 | Grigsby et al. |
| 2010/0097227 | A1 | 4/2010 | Kim |
| 2011/0183650 | A1 | 7/2011 | McKee |
| 2011/0267196 | A1 | 11/2011 | Hu et al. |
| 2012/0084248 | A1 | 4/2012 | Gavrilescu et al. |
| 2012/0127343 | A1 | 5/2012 | Park |
| 2012/0158943 | A1 | 6/2012 | Esteve Balducci et al. |
| 2012/0229276 | A1 | 9/2012 | Ronkainen |
| 2012/0323933 | A1 | 12/2012 | He et al. |
| 2013/0045685 | A1 | 2/2013 | Kiani et al. |
| 2013/0316744 | A1 | 11/2013 | Newham et al. |
| 2013/0324196 | A1 | 12/2013 | Wang et al. |
| 2014/0058679 | A1* | 2/2014 | Varoglu ............ H04M 1/72454 702/19 |
| 2014/0085077 | A1 | 3/2014 | Luna et al. |
| 2014/0101611 | A1 | 4/2014 | Lang et al. |
| 2014/0101644 | A1 | 4/2014 | Buzaski et al. |
| 2014/0171132 | A1 | 6/2014 | Ziemianska et al. |
| 2014/0171146 | A1 | 6/2014 | Ma et al. |
| 2014/0172873 | A1 | 6/2014 | Varoglu et al. |
| 2014/0206327 | A1 | 7/2014 | Ziemianska et al. |
| 2016/0036996 | A1 | 2/2016 | Midholt et al. |
| 2016/0066124 | A1 | 3/2016 | Chang et al. |
| 2016/0163181 | A1 | 6/2016 | Levy et al. |
| 2016/0182710 | A1 | 6/2016 | Flamini et al. |
| 2016/0202667 | A1 | 7/2016 | Wen |
| 2016/0241706 | A1 | 8/2016 | Ziemianska et al. |
| 2016/0321616 | A1 | 11/2016 | Gedge et al. |
| 2017/0038741 | A1 | 2/2017 | Watanabe |
| 2018/0059625 | A1 | 3/2018 | Yang |
| 2018/0081324 | A1 | 3/2018 | Sharoni |

FOREIGN PATENT DOCUMENTS

| | | | |
|---|---|---|---|
| CN | 101471978 | A | 7/2009 |
| CN | 202057981 | U | 11/2011 |
| CN | 102804238 | A | 11/2012 |
| CN | 104937520 | A | 9/2015 |
| EP | 2 747 392 | A1 | 6/2014 |
| EP | 2 941 679 | | 11/2015 |
| GB | 2 434 720 | A | 8/2007 |
| HK | 1214010 | A1 | 7/2016 |
| JP | 2009232925 | A | 10/2009 |
| TW | 200642421 | A | 12/2006 |
| TW | 201622438 | A | 5/2016 |
| TW | I615048 | B | 2/2018 |
| WO | 2012/021507 | A2 | 2/2012 |
| WO | 2014113248 | A1 | 7/2014 |
| WO | 2016036505 | A1 | 3/2016 |

OTHER PUBLICATIONS

"Advisory Action", dated Mar. 6, 2015, in U.S. Appl. No. 13/714,753. 3 pages.
"Final Office Action", dated Dec. 22, 2014, in U.S. Appl. No. 13/714,753. 22 pages.
"Final Office Action", dated Sep. 3, 2015, in U.S. Appl. No. 13/714,753. 37 pages.
"Non-Final Office Action", dated Mar. 27, 2014, in U.S. Appl. No. 13/714,753. 22 pages.
"Non-Final Office Action", dated Sep. 26, 2014, in U.S. Appl. No. 13/714,753. 31 pages.
"Non-Final Office Action", dated Apr. 27, 2015, in U.S. Appl. No. 13/714,753. 35 pages.
"Notice of Allowance", dated Feb. 13, 2019, in U.S. Appl. No. 13/714,753. 8 pages.
"Advisory Action", dated Dec. 31, 2015, in U.S. Appl. No. 13/715,096. 3 pages.
"Final Office Action", dated Sep. 9, 2015, in U.S. Appl. No. 13/715,096. 10 pages.
"Non-Final Office Action", dated Jan. 27, 2015, in U.S. Appl. No. 13/715,096. 11 pages.
"Final Office Action", dated Apr. 1, 2015, in U.S. Appl. No. 13/744,547. 9 pages.
"Non-Final Office Action", dated May 28, 2014, in U.S. Appl. No. 13/744,547. 9 pages.
"Notice of Allowance", dated Aug. 11, 2015, in U.S. Appl. No. 13/744,547. 5 pages.
"Final Office Action", dated Oct. 12, 2016, in U.S. Appl. No. 14/475,445. 11 pages.
"Non-Final Office Action", dated Feb. 21, 2017, in U.S. Appl. No. 14/475,445. 13 pages.
"Non-Final Office Action", dated Aug. 4, 2017, in U.S. Appl. No. 14/475,445. 15 pages.
"Non-Final Office Action", dated Jun. 2, 2016, in U.S. Appl. No. 14/475,445. 9 pages.
"Final Office Action", dated Nov. 17, 2016, in U.S. Appl. No. 14/992,897. 15 pages.
"Non-Final Office Action", dated Jul. 28, 2016, in U.S. Appl. No. 14/992,897. 12 pages.
"Notice of Allowance", dated Mar. 1, 2017, 7 pages, in U.S. Appl. No. 14/992,897.
"Office Action", dated Feb. 16, 2017, in Taiwanese Patent Application No. 104128529. 10 pages (with English translation).
"Office Action", dated Jul. 11, 2016, in Taiwanese Patent Application No. 104128529. 10 pages (with English translation).
"Non-Final Office Action," dated Dec. 30, 2019 in U.S. Appl. No. 16/380,122. 6 pages.
"Notice of Allowance," dated May 20, 2020 in U.S. Appl. No. 16/380,122. 8 pages.
"Notice of Allowability," dated Jul. 8, 2020 in U.S. Appl. No. 16/380,122. 2 pages.
"Notice of Allowance," dated Oct. 2, 2020 in U.S. Appl. No. 16/380,122. 8 pages.

(56) References Cited

OTHER PUBLICATIONS

"Notice of Allowance," dated Jul. 22, 2021 in U.S. Appl. No. 17/013,184. 9 pages.
U.S. Appl. No. 17/238,022, Notice of Allowance, dated Sep. 9, 2022, 9 pages.
"DPAC Dynamically Programmable Alarm Clock", Web Post and Video Demonstration based on an EE Capstone Competition Design Project presented at Northeastern University, Apr. 8, 2010, 15 pages.
Costello, "Using Do Not Disturb on iPhone", Available Online at, https://web.archive.org/web/20130116134725/http://ipod.about.com/od/phonefeatures/a/Using-Do-Not-Disturb-On-Iphone.htm, Jun. 15, 2012, 1 page.
"International Search Report and Written Opinion", dated Mar. 25, 2014, in International Application No. PCT/US2014/010637. 9 pages.
"International Search Report and written opinion", dated Oct. 29, 2015, in International Application No. PCT/US2015/045743. 9 pages.
Pina et al., "Fitbit+: A behavior-based intervention system to reduce sedentary behavior", CHI 2012, May 7-12, 2012, 4 pages.
"Notice of Decision to Grant", dated Oct. 26, 2017, in Taiwanese Patent Application No. 104128529. 6 pages. (English translation of allowed claims only).
Lex et al., "Alarm Failsafe: Wake Me Up if I Fall Back Asleep." Google Groups. Downloaded from https://groups.google.com/forum/#!msg/tasker/j7s032C_Ptc/01HQDB3_kRoJ_on May 7, 2019. 1 page.
"Walk Me Up! Alarm Clock—Apps on Google Play." Downloaded from https://play.google.com/store/apps/details?id=com.moosa.alarmclock&hl=en on May 7, 2019. 3 pages.
Canella, Andres, "Wake N Shake Alarm Clock." The App Store. Downloaded from https://play.google.com/store/apps/details?id=com.moosa.alarmclock&hl=en on May 7, 2019. 3 pages.
"Chinese Office Action," dated Jan. 12, 2017 in CN Patent Application No. 201480005135.5. 35 pages.
"Chinese Office Action," dated Oct. 10, 2017 in CN Patent Application No. 201480005135.5. 19 pages (includes English translation).
"European Office Action," dated Nov. 15, 2017 in EP 14701859.2. 4 pages.
"Office Action", dated Feb. 16, 2017, in Taiwanese Patent Application No. 104128529. 16 pages (with English translation).
"Office Action", dated Jul. 11, 2016, in Taiwanese Patent Application No. 104128529. 18 pages (with English translation).

* cited by examiner

METHODS AND SYSTEMS FOR DISABLING SLEEP ALARM BASED ON AUTOMATED WAKE DETECTION

CROSS-REFERENCES TO RELATED APPLICATIONS

This application is a continuation of U.S. application Ser. No. 17/013,184, filed Sep. 4, 2020, entitled "METHODS AND SYSTEMS FOR DISABLING SLEEP ALARM BASED ON AUTOMATED WAKE DETECTION," which is a continuation of U.S. application Ser. No. 16/380,122, filed Apr. 10, 2019, (patented as U.S. Pat. No. 10,854,066 on Dec. 1, 2020) entitled "METHODS AND SYSTEMS FOR DISABLING SLEEP ALARM BASED ON AUTOMATED WAKE DETECTION," which claims priority to U.S. Provisional Application Ser. No. 62/656,847, filed Apr. 12, 2018, entitled "METHODS AND SYSTEMS FOR DISABLING SLEEP ALARM BASED ON AUTOMATED WAKE DETECTION." The disclosure of these applications are incorporated by reference herein in their entirety for all purposes.

FIELD OF INVENTION

The present disclosure relates generally to facilitating intelligent and preemptive disablement of an alarm. More specifically, sensor and/or interaction data is monitored to detect measurements corresponding with a wakefulness state, which triggers an alarm disablement process.

BACKGROUND

Various devices have alarm capabilities, such that a user can identify an alarm time, and the device will output an audio signal at the alarm time. However, most alarms are rather inflexible, in that the alarm reliably sounds irrespective of a context.

SUMMARY

In some embodiments, an electronic device is provided that includes one or more data processors and a non-transitory computer readable storage medium containing instructions which, when executed on the one or more data processors, cause the one or more data processors to perform a set of actions. The set of actions include accessing alarm data that indicates that an alarm is enabled to present an alarm stimulus at a preset alarm time and, prior to the preset alarm time, collecting activity-indicative data. The activity-indicative data includes one or more measurements collected by a sensor of the electronic device or one or more inputs received at an interface of the electronic device. The set of actions also includes accessing a wakefulness condition that is configured to be satisfied when the activity-indicative data has one or more characteristics that are specified in the wakefulness condition. The set of actions further includes determining, based on the activity-indicative data and at the electronic device, that the wakefulness condition is satisfied and, in response to the determination that the wakefulness condition is satisfied, displaying a disablement query that includes an option to disable the alarm. The set of actions still further includes detecting a selection, responsive to the disablement query, of the option to disable the alarm and, in response to receipt of the selection, disabling the alarm such that the alarm stimulus is not to be presented at the preset alarm time.

In some embodiments, a computer-program product is provided that is tangibly embodied in a non-transitory machine-readable storage medium. The computer-program product including instructions configured to cause one or more data processors to perform a set of actions. The set of actions includes accessing, at an electronic device, alarm data that indicates that an alarm is enabled to present an alarm stimulus at a preset alarm time and, prior to the preset alarm time, collecting, at the electronic device, activity-indicative data. The activity-indicative data includes one or more measurements collected by a sensor of the electronic device or one or more inputs received at an interface of the electronic device. The set of actions also includes accessing a wakefulness condition that is configured to be satisfied when the activity-indicative data has one or more characteristics that are specified in the wakefulness condition and determining, based on the activity-indicative data and at the electronic device, that the wakefulness condition is satisfied. The set of actions further includes, in response to the determination that the wakefulness condition is satisfied, displaying, by the electronic device, a disablement query that includes an option to disable the alarm and detecting a selection, responsive to the disablement query, of the option to disable the alarm. The set of actions still further includes, in response to receipt of the selection, disabling the alarm such that the alarm stimulus is not to be presented at the preset alarm time.

In some embodiments, a method is provided. Alarm data is accessed at a device, the alarm data indicating that an alarm is enabled to present an alarm stimulus at a preset alarm time. Prior to the preset alarm time, activity-indicative data is collected at the electronic device. The activity-indicative data includes one or more measurements collected by a sensor of the electronic device or one or more inputs received at an interface of the electronic device. A wakefulness condition is accessed that is configured to be satisfied when the activity-indicative data has one or more characteristics that are specified in the wakefulness condition. It is determined, based on the activity-indicative data and at the electronic device, that the wakefulness condition is satisfied. In response to the determination that the wakefulness condition is satisfied, a disablement query is displayed by the electronic device. The disablement query includes an option to disable the alarm. A selection, responsive to the disablement query, of the option to disable the alarm is detected. In response to receipt of the selection, the alarm is disabled such that the alarm stimulus is not to be presented at the preset alarm time.

The following detailed description together with the accompanying drawings will provide a better understanding of the nature and advantages of the present invention.

DETAILED DESCRIPTION

Figure 1:
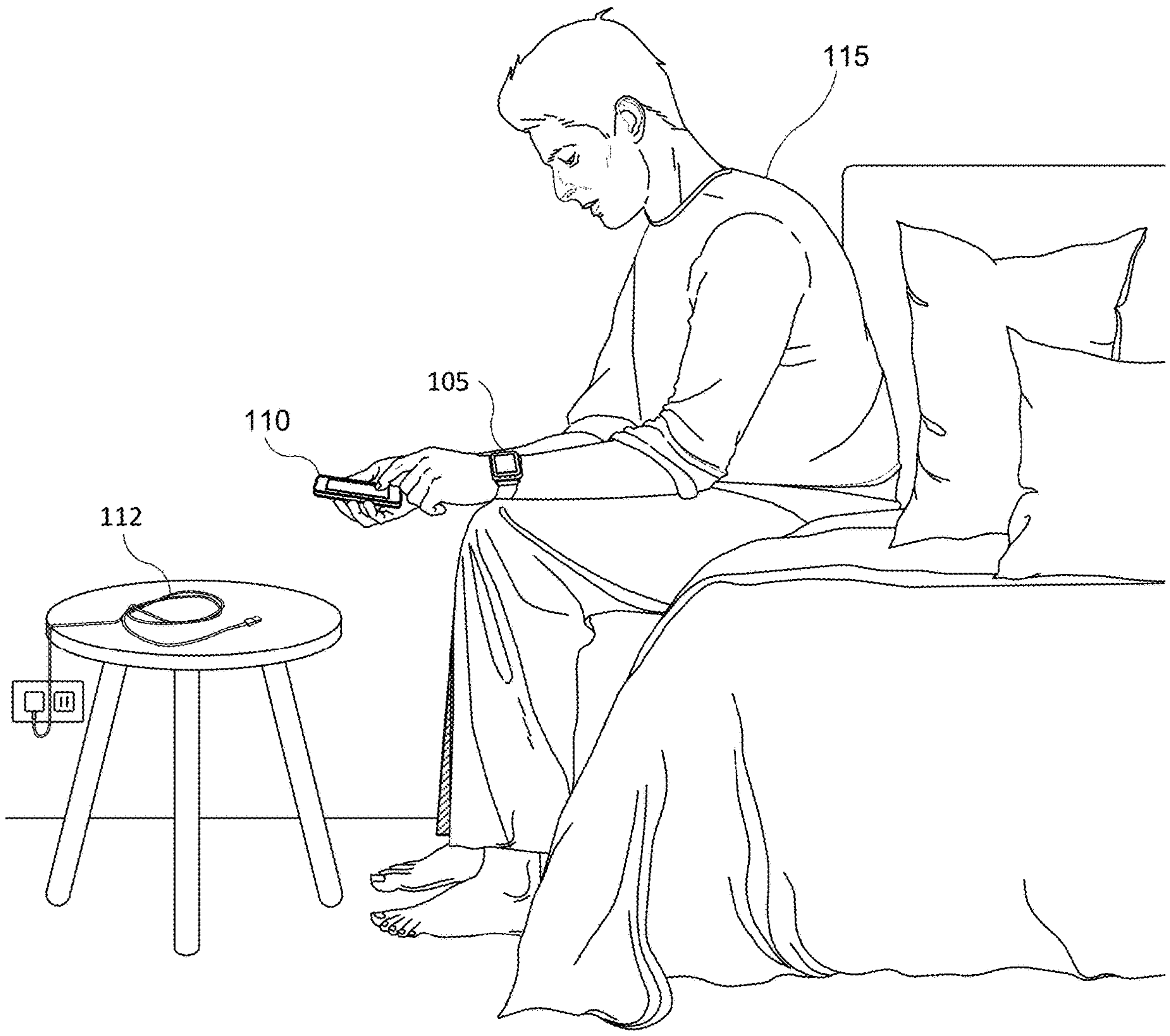
FIG. 1 illustrates an example of a setting in which sensor data and/or interaction data is detected that triggers a disablement of an alarm.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes can be made in the function and arrangement of elements without departing from the spirit and scope as set forth in the appended claims.

In some embodiments, a device (e.g., a smart phone or smart wearable device) enters a wakefulness-monitoring state during a time period preceding a time of an alarm (e.g., four hours before the time of the alarm). In the wakefulness-monitoring state, activity-indicative data (e.g., sensor data and/or input data) is monitored. Each of one or more conditions can be evaluated using the sensor data and/or interaction data. Each of the one or more conditions can be configured to be satisfied upon detecting (for example) sensor data corresponding to of a magnitude above one or more corresponding thresholds. For example, a condition can be configured to be satisfied when: at least a predefined number of consecutive steps have been detected as estimated using sensor data from (for example) a device's accelerometer(s) and/or gyroscope, a rotation of a device exceeds a predefined angle, a device is unlocked via entry of a pass code or biometric input, a device is in an unlocked state for at least a predefined time, a power source for a device has changed (e.g., a device is unplugged), and/or data collected by an optical sensor detects that a wearable device indicates that it has transitioned from a state indicating that the device is not being worn to a state indicating that it is being worn by a user. It will be appreciated that a condition can depend on a variable derived from sensor data, such as an elbow angle, angle of a user's forearm relative to the horizon, or a step count In some instances, a condition is based on detection of multiple types of actions, potentially in a specific order. For example, a condition can be configured to be satisfied when motion data collected on a wearable indicates that a user moved from sitting to standing and that other subsequent motion data indicated that the user then walked at least 20 steps. As another example, a condition can be configured to be satisfied when motion data indicates that a device was picked up from a horizontal position and that the device then moved at least 40 feet. A condition may be configured to include Boolean operands (e.g., AND, OR, etc.).

Upon detecting that a condition (or combination of conditions) is satisfied, the device can present a notification that requests input as to whether to disable (or deactivate) the alarm. For example, the notification can state: "Do you want to turn off your 7:00 am alarm?" and include an input option that, when selected via corresponding user input, corresponds to an instruction to disable the alarm. Upon receiving this instruction, the device can disable (e.g., turn off) and/or disable the alarm. In instances when the device is configured to synchronize alarms across multiple devices (e.g., each associated with a same user or user profile), the device can transmit an instruction (e.g., to a coordinating remote server or to one or more of the multiple devices) that corresponds to an instruction to disable the alarm (e.g., and specifically identifying the alarm).

Thus, the device can intelligently infer when a user is awake by monitoring and assessing activity-indicative data (e.g., sensor measurement(s) and/or input data). More specifically, the inference can be positively made in response to detecting activity-indicative data that corresponds to awake profiles as set forth in one or more conditions. The inference can be confirmed upon receiving input from a user, in response to a notification, that indicates that the alarm is to be disabled.

Disclosed techniques have various advantages. For example, intelligently inferring when a user is awake and triggering an alarm-disablement process can avoid annoying a user with a superfluous alarm and further not require the user to remember to interact with the phone to disable the alarm before it is presented. Meanwhile, the actual disablement itself can be semi-automated, such that an alarm is not disabled until user input is received that corresponds to an instruction to disable the alarm. This semi-automated approach reduces the potentially disastrous (in the user's life) consequence of a false-positive wake detection, in which it is inferred that the user is awake, though the alarm is still needed.

Further, the monitoring of activity-indicative data and condition assessment can be restricted to a particular time window preceding an alarm time. This timing constraint can reduce use of processing resources and a quantity of notifications presented to users.

FIG. 1 illustrates an example of a setting in which activity-indicative data is detected that triggers a disablement of an alarm. In the illustrated instance, two devices (a smart watch 105 and a smart phone 110) are associated with a profile of a single user 115. An alarm for 7 am is enabled for the profile in response to a previous detection of input at smart phone 110 that has set and/or enabled the alarm. Smart watch 105 and smart phone 110 can synchronize alarm data, such that alarm data identifying the enabled 7 am alarm is stored at both smart watch 105 and smart phone 110. The input and alarm data can further indicate that the alarm is designated as a sleep alarm (or bedtime alarm), which can indicate that wakefulness monitoring and a process for wakefulness-triggered alarm disablement are to be performed.

Smart watch 105 and smart phone 110 can commence assessing activity-indicative data for indications as to whether to make a wakefulness inference (inferring that a user is awake for the day) at a predefined time before the alarm time. The alarm time can include a preset alarm time, which can correspond to one identified based on input received via an interface of a device (e.g., of smart watch 105 or smart phone 110). Specifically, such assessments can begin thirty minutes before the alarm time, which is 5:30 am. In some instances, the assessment can be performed (for example) at regular intervals (e.g., every minute based on data from the last three minutes or other time period) or continuously.

In the depicted instance, user 115 has moved from a laying-down position to sitting. A gyroscope, magnetometer and/or accelerometer in smart watch 105 can detect the corresponding motion. These measurements can be assessed using a wakefulness condition. In this instance, the gyroscope measurements can be a first predefined threshold in a first condition, but the first condition requires not an only above-threshold gyroscope measurement but also a subsequent number of steps in a walking session that exceeds a second predefined threshold (e.g., having exceed the second predefined threshold within a predefined time window from the above-threshold gyroscope measurement). Thus, the first condition is not yet satisfied.

Meanwhile, user 115 has also unplugged smart phone 110 from a charging cord 120. A second condition can be configured to be satisfied when a device is disconnected from a power source and when the device is moved by at least 50 feet within a subsequent 20-minute time period. Thus, the second condition is not yet satisfied.

User 115 further has just completed unlocking smart phone 110 via entry of a passcode. A third condition can be configured to be satisfied when a device transitions from a locked to an unlocked state. Thus, the third condition is satisfied.

Upon detecting that a wakefulness condition is satisfied, a notification can be presented on a display of smart phone 110 that recites: "Turn off upcoming 7 am alarm?" along with a first input option (e.g., a first virtual button) configured to receive input corresponding to a confirmatory response ("Yes") and a second input option (e.g., a second virtual button) configured to receive input corresponding to a negative response ("No").

Here, user 115 is selecting the "Yes" virtual button. This response can cause smart phone 110 to disable the 7 am, such that alarm stimuli (e.g., alarm audio and/or haptic signals) are not presented at 7 am. Further, smart phone 110 can transmit an indication that the 7 am alarm is to be disabled either directly or indirectly to smart watch 105, such that the 7 am alarm data stored at smart watch 105 is disabled. Thus, user 115 is not unnecessarily annoyed with alarm stimuli at 7 am. Upon disablement, wakefulness monitoring associated with the 7 am alarm can cease.

Figure 2:
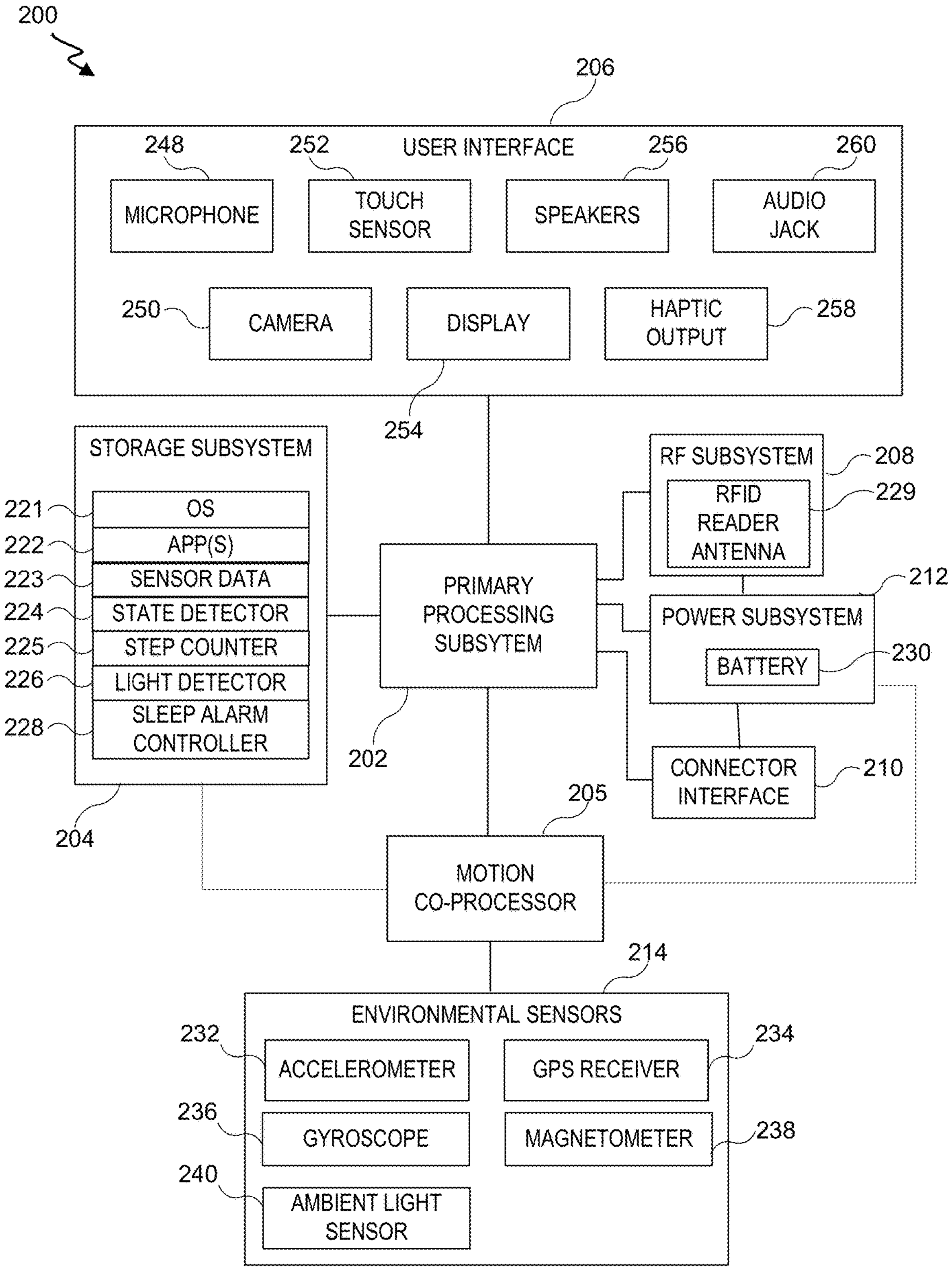
FIG. 2 is an example schematic diagram of an electronic device configured to facilitate selective disablement of alarms in accordance with an embodiment of the present invention.

FIG. 2 is an example schematic diagram of an electronic device 200 (e.g., a smart phone) configured to facilitate selective disablement of alarms in accordance with an embodiment of the present invention. Electronic device 200 can include a primary processing subsystem 202, a storage subsystem 204, a user interface 206, one or more connection components (e.g., transceiver subsystem 208), a power subsystem 212, environmental sensors 214 and a motion co-processor 205. Electronic device 200 can also include other components (not explicitly shown).

Primary processing subsystem 202 can be implemented as one or more integrated circuits, e.g., one or more single-core or multi-core microprocessors or microcontrollers, examples of which are known in the art. In operation, primary processing subsystem 202 can control the operation of electronic device 200. In various embodiments, primary processing subsystem 202 can execute a variety of programs in response to program code and can maintain multiple concurrently executing programs or processes. At any given time, some or all of the program code to be executed can be resident in primary processing subsystem 202 and/or in storage media such as storage subsystem 204.

Through suitable programming, primary processing subsystem 202 can provide various functionality for electronic device 200. For example, primary processing subsystem 202 can execute code to facilitate semi-automated disablement of an alarm. The facilitation can include, for example, detecting an indication that a wakefulness condition has been satisfied and presenting a query as to whether a particular alarm is to be disabled. Primary processing subsystem 202 can detect and characterize any responsive input, which can be communicated to an alarm-controlling module. Further, primary processing subsystem 202 can generate, enable and/or disable alarms upon receiving corresponding instructions. Primary processing subsystem 202 can trigger presentation of alarm stimuli at an alarm time of an enabled alarm. In some instances, primary processing subsystem 202 evaluates each of one or more wakefulness conditions based on activity-indicative data. In some instances, at least some or all of the evaluations of one or more wakefulness conditions is instead performed by motion co-processor 205 (e.g., to facilitate condition evaluations while electronic device 200 is in a sleep or low-power state).

Storage subsystem 204 can be implemented, e.g., using magnetic storage media, flash memory, other semiconductor memory (e.g., DRAM, SRAM), or any other non-transitory storage medium, or a combination of media, and can include volatile and/or non-volatile media.

In some embodiments, storage subsystem 204 can store code or instructions for an operating system 221 and/or one or more application programs (or apps) 222 to be executed by primary processing subsystem 202. Storage subsystem 204 can store sensor data 223, which can include data collected by one or more of environmental sensors 214. Storage subsystem 204 can include modules (e.g., state detector 224, step counter 225, light detector 226 and sleep alarm controller 228), each of which can be configured as an individual app, a part of an app, a function or other piece of executable code.

State detector 224 can be configured to detect one or more states of electronic device 200, such as charging state (i.e., whether it is connected to a charging source), a sleep state (i.e., whether the device is in a low-power sleep state), and/or a locked state (i.e., whether the device is in a locked state, such that a target biometric or passcode input is required to avail various basic app functionalities). The detections can be made based on (for example) data from power subsystem 212, data from connector interface 210, monitoring of past state transitions and/or assessments of current state configurations.

Step counter 225 can be configured to use data from one or more environmental sensors 214 to detect individual user steps. For example, sensor data can be compared to one or more thresholds or profiles to determine whether a step occurred. Each detected step can be assigned to an epoch that represents continuous walking based on (for example) a continuity of movement (e.g., acceleration and/or deceleration values staying beneath a predefined acceleration threshold and/or a velocity values remaining above a predefined velocity threshold) and/or short interval between steps (e.g., with times between consecutive steps remaining below a predefined interval threshold). In some instances, step counter 225 first identifies a stepping epoch that include multiple steps (e.g., at least 8) based on frequencies of signals from one or more sensors (e.g., an accelerometer, magnetometer, barometer, gyroscope and/or compass) and then back-assigns steps to the epoch and continues to expand the epoch with detection of any additional steps (e.g., detected based on a step frequency determined for the epoch and sensor data).

Light detector 226 can be configured to measure an intensity of ambient light. Light detector 226 can include one or more photosensors to detect an intensity of light in one or more spectrum (e.g., visible light and/or infrared light).

Sleep alarm controller 228 can be configured to use sensor data, one or more device states, detected steps, one or more detected light intensity and/or other data (e.g., input received at electronic device 200) to determine whether a wakefulness condition is satisfied. In some instances, motion co-processor 205 executes code of sleep alarm controller 228 to assess one or more wakefulness conditions. Upon detecting that a wakefulness condition is satisfied, sleep alarm controller 228 can be configured to disable an alarm in an automated or semi-automated manner. With regard to the semi-automated instance, sleep alarm controller 228 can instruct primary processing subsystem 202 to present a stimulus that corresponds to a query to a user as to whether to disable an alarm. When a response corresponding to an instruction to disable the alarm is received, sleep alarm controller 228 can disable the alarm such that alarm stimuli are not presented at the alarm time.

Transceiver subsystem 208 can allow electronic device 200 to communicate wirelessly with various electronic devices. Transceiver subsystem 208 can include a component, such as an antenna (e.g., a radio frequency identification (RFID) tag antenna 229) and supporting circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication. In some embodiments, transceiver subsystem 208 can implement a proximity sensor that supports proximity detection (e.g., via NFC or Bluetooth Low Energy) through a detection of a signal, estimation of signal strength and/or other protocols for determining proximity to another electronic apparatus.

RFID tag antenna 229 can include, for example, an NFC antenna and/or a loop antenna with one or more loops. In some instances, a length of antenna is less than, e.g., 1, 2, 5 or 10 cm. RFID tag antenna 229 can include or be a passive, receiving antenna. An operating frequency of RFID tag antenna 229 can include a low frequency (e.g., 125-134 kHz), high frequency (e.g., between 10-30 MHz, such as 13.56 MHz) or ultra-high frequency (e.g., greater than 800 MHz).

In some embodiments, transceiver subsystem 208 can provide NFC capability, e.g., implementing the ISO/IEC 18092 standards or the like; NFC can support wireless data exchange between devices over a very short range (e.g., 20 centimeters or less). Transceiver subsystem 208 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into transceiver subsystem 208. In some instances, a same component of transceiver subsystem 208 can serve to receive incoming signals and transmit outgoing signals. In some instances, different components handle incoming and outgoing signals.

In some embodiments, electronic device 200 includes a power subsystem 212 that can provide power management capabilities and power for electronic device 200. Power subsystem 212 can include circuitry to distribute received, converted and/or stored power to other components of electronic device 200 that require electrical power.

In some (but not other instances), power subsystem 212 can include a battery 230 (e.g., a rechargeable battery) and can also include circuitry operable to charge battery 230. Thus, in some embodiments, power subsystem 212 can include a "wireless" charger, such as an inductive charger, to charge battery 230. This capability can be used to extend a time during which electronic device 200 can transmit data (e.g., such that data can be transmitted even when it is not sufficiently close to be powered by a nearby electronic device) and/or can allow electronic device 200 to communicate using a different communication protocol and/or over a larger range.

In some embodiments, power subsystem 212 can control power distribution to components within electronic device 200 to manage power consumption efficiently. For example, power subsystem 212 can automatically place electronic device 200 into a "hibernation" or "sleep" state when it is determined or inferred that no electronic device is nearby (e.g., due to a lack of incoming signals). The hibernation or sleep state can serve to inhibit or pause outgoing transmissions of data. In some instances, a device is also in a "locked" state while it is in a hibernation or sleep state and a normal-operation state, in that biometric data or character passcode that matches a stored unlocking data is required to unlock the device and avail basic device features (e.g., use of primary functions of multiple apps, email apps, ability to place a non-emergency call, etc.).

Power subsystem 212 can also provide other power management capabilities, such as regulating power consumption of other components of electronic device 200 based on the source and amount of available power, monitoring stored power in battery 230, and so on.

In some embodiments, control functions of power subsystem 212 can be implemented using programmable or controllable circuits operating in response to control signals generated by primary processing subsystem 202 in response to program code executing thereon, or as a separate microprocessor or microcontroller. Power subsystem 212 can be configured to detect whether a power source is a battery or another source (e.g., an AC source). Power subsystem 212 can be configured to detect whether (or when) electronic device 200 is charging and/or connecting to a physical charging element (e.g., a charging cord).

In some instances, electronic device 200 includes one or more environmental sensors 214, such as one or more electronic, mechanical, electromechanical, optical, or other devices that provide information related to internal external conditions around electronic device 200. Environmental sensors 214 in some embodiments can provide digital signals to primary processing subsystem 202, e.g., on a push (e.g., streaming or regular-communication) basis or in response to polling by processing subsystem 202 as desired. Any type and combination of sensors can be used; shown by way of example are an accelerometer 232, a GPS receiver 234, a gyroscope 236, a magnetometer 238 and an ambient light sensor 240. One or more of environmental sensors 214 (e.g., accelerometer 232, GPS receiver 234, gyroscope 236 and magnetometer 238) can be configured to detect information about a motion and/or location of electronic device 200.

Accelerometer 232 can detect an acceleration of electronic device 200 (e.g., generally or in each of one or more directions). For example, accelerometer 232 can include a three-axis or six-axis accelerometer. Accelerometer data can identify (for example) an acceleration experienced along each of one or more (e.g., three or six) axes and can further identify an orientation of electronic device 200. GPS receiver 234 can receive communications from multiple GPS satellites and estimate a location of electronic device 200. It will be appreciated that other sensors can also be included in addition to or instead of these examples.

Gyroscope 236 can include, for example, a MEMS gyroscope that detects an orientation of electronic device 200. For example, gyroscope 236 can identify an angular position of electronic device 200 along one or more (e.g., three) axes.

Magnetometer 238 can be configured to measure characteristics of a magnetic field. Such characteristics can be used to identify geospatial directions (e.g., identifying which direction, relative to electronic device 200) is north.

Ambient light sensor 240 can include one or more photosensors to identify a light intensity of an ambient environment. The intensity, some instances, is mapped to one or more bands of light intensity, which range from dark-to-light categories. It will be appreciated that electronic device 200 can alternatively or additionally include one or more additional types of sensors, such as a barometer that can be used to detect altitude data.

In some instances, one or more environmental sensors 214 can be at least partly controlled and/or accessible to motion co-processor 205. Motion co-processor 205 can be configured to always (so long as electronic device 200 is powered on) receive power from power subsystem 212, such that it is always on to receive and process sensor data from one or more environmental sensors 214. For example, one or more environmental sensors 214 can receive and affect an instruction from motion co-processor 205 to begin collecting measurements and/or reporting measured data. In a particular instance, motion co-processor 205 can subscribe to receive data from one or more sensors (e.g., upon determining that a current time is within a predefined time from an alarm time). The sensor(s) can then transmit data (e.g., in a streaming fashion or in accordance with a transmission schedule) in a communication channel, such that it can be assessed (e.g., at motion co-processor 205) to determine whether a wakefulness condition is satisfied. In some instances, motion co-processor pulls data from the sensor(s). For example, motion co-processor 205 maybe configured to detect a quantity of time blocks (e.g., of specified duration) across which a minimum, median or mean sensor reading is above a predefined threshold. As another example, motion co-processor 205 may be configured to detect a moving average (or moving median) of sensor measurements.

Motion co-processor 205 can be implemented as one or more integrated circuits, e.g., one or more single-core or multi-core microprocessors or microcontrollers, examples of which are known in the art. Motion co-processor 205 can be configured to be independent from primary processing subsystem 202. In operation, motion co-processor 205 can control at least some of the operation of electronic device 200. In various embodiments, motion co-processor 205 can execute a variety of programs (e.g., relating to capture and/or process of sensor data and/or motion data) in response to program code and can maintain multiple concurrently executing programs or processes. At any given time, some or all of the program code to be executed can be resident in motion co-processor 205 and/or in storage media such as storage subsystem 204.

Through suitable programming, motion co-processor 205 can provide various functionality for electronic device 200. For example, motion co-processor 205 can execute code to facilitate semi-automated disablement of an alarm. The facilitation can include, for example, collecting data from one or more sensors and determining whether a wakefulness condition is satisfied based on the collected data.

User interface 206 can include any combination of input and output devices. In some instances, a user can operate input devices of user interface 206 to invoke the functionality of electronic device 200 and can view, hear, and/or otherwise experience output from electronic device 200 via output devices of user interface 206. Examples of input devices include microphone 248, touch sensor 252, and camera 250. Examples of output devices include display 254, speakers 256, and haptic output generator 258.

Microphone 248 can include any device that converts sound waves into electronic signals. In some embodiments, microphone 248 can be sufficiently sensitive to provide a representation of specific words spoken by a user; in other embodiments, microphone 248 can be usable to provide indications of general ambient sound levels without necessarily providing a high-quality electronic representation of specific sounds.

Camera 250 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 204 and/or transmitted by electronic device 200 to other devices for storage. Depending on implementation, the optical components can provide fixed focal distance or variable focal distance; in the latter case, autofocus can be provided. In some embodiments, camera 227 can be disposed along an edge of a face member of a device, e.g., the top edge, and oriented to allow a user to capture images of nearby objects in the environment such as a bar code or QR code. In other embodiments, camera 250 can be disposed on the front surface of a device face member, e.g., to capture images of the user. Zero, one, or more cameras can be provided, depending on implementation.

Touch sensor 252 can include, e.g., a capacitive sensor array with the ability to localize contacts to a particular point or region on the surface of the sensor and in some instances, the ability to distinguish multiple simultaneous contacts. In some embodiments, touch sensor 252 can be overlaid over display 254 to provide a touchscreen interface, and processing subsystem 202 can translate touch events (including taps and/or other gestures made with one or more contacts) into specific user inputs depending on what is currently displayed on display 254.

Display 254 can be implemented using compact display technologies, e.g., LCD (liquid crystal display), LED (light-emitting diode), OLED (organic light-emitting diode), or the like. In some embodiments, display 254 can incorporate a flexible display element or curved-glass display element, allowing electronic device 200 to conform to a desired shape. One or more speakers 256 can be provided using small-form-factor speaker technologies, including any technology capable of converting electronic signals into audible sound waves. In some embodiments, speakers 256 can be used to produce tones (e.g., beeping or ringing) and can but need not be capable of reproducing sounds such as speech or music with any particular degree of fidelity. Haptic output generator 258 can be, e.g., a device that converts electronic signals into vibrations; in some embodiments, the vibrations can be strong enough to be felt by a user wearing electronic device 200 but not so strong as to produce distinct sounds.

In some embodiments, user interface 206 can provide output to and/or receive input from an auxiliary device such as a headset. For example, audio jack 260 can connect via an audio cable (e.g., a standard 2.5-mm or 2.5-mm audio cable) to an auxiliary device. Audio jack 260 can include input and/or output paths. Accordingly, audio jack 260 can provide audio to the auxiliary device and/or receive audio from the auxiliary device. In some embodiments, a wireless connection interface can be used to communicate with an auxiliary device.

One or more output devices can be used to present a query as to whether to disable an alarm. For example, upon determining that a wakefulness condition is satisfied, speakers 256 can emit a tone, haptic output generator 258 can output a vibration, and display 254 can present text and/or input options (e.g., "Disable 7:30 am alarm?" with a "Yes" and "No" virtual option). One or more input devices can be configured to receive input that facilitates initial setting of an alarm, enablement of an alarm and/or responding to a disablement query.

It will be appreciated that electronic device 200 is illustrative and that variations and modifications are possible. For example, transceiver subsystem 208 can include a different type of antenna 209 and/or can include one or more frequency-tuning components (e.g., capacitors). As another example, environmental sensors 214 can include one or more other types of sensors (e.g., a temperature monitor). As yet another example, storage subsystem 204 can include code to perform calling and/or email functions.

Further, while the electronic device 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including devices implemented using any combination of circuitry and software. It is also not required that every block in FIG. 2 be implemented in a given embodiment of an electronic device.

Figure 3:
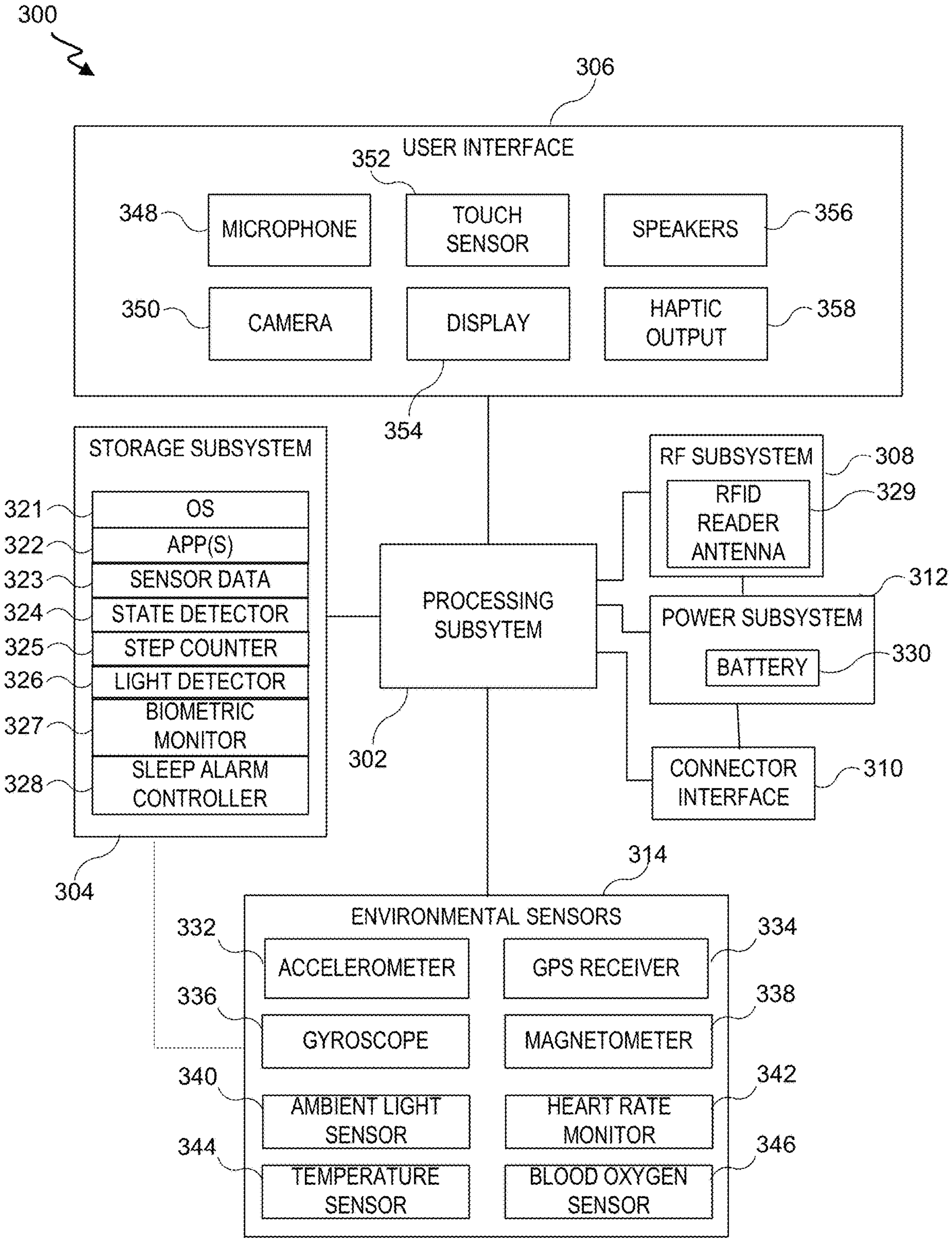
FIG. 3 is an example schematic diagram of a wearable electronic device according to an embodiment of the present invention.

FIG. 3 is an example schematic diagram of a wearable electronic device 300 according to an embodiment of the present invention. One or more components of wearable electronic device 300 can parallel or complement similarly numbered components of electronic device 200. Wearable electronic device 300 can also include other components (not explicitly shown).

Wearable electronic device 300 can include (for example) a necklace, headband, clip, belt, bracelet, watch, pair of glasses, armband, or ear piece. In some embodiments, wearable electronic device 300 can accept a variety of bands, straps, or other retention mechanisms (collectively, "bands"). These bands can be removably connected to the electronic device by a lug that is accepted in a recess or other aperture within the device and locks thereto. The lug can be part of the band or can be separable (and/or separate) from the band. Generally, the lug can lock into the electronic device's recess and thereby maintain connection between the band and device. The user can release a locking mechanism to permit the lug to slide or otherwise move out of the recess. In some embodiments, the recess can be formed in the band and the lug can be affixed or incorporated into the device.

Wearable electronic device 300 can include one or more components not included in the embodiment of electronic device 200 as depicted in FIG. 2. For example, wearable electronic device 300 can include one or more biometric sensors, such as a heart rate monitor 342, temperature sensor 344 and blood oxygen sensor 346. One or more of the biometric sensors (e.g., temperature sensor 344 and/or blood oxygen sensor 346) can be included in a band of wearable electronic device (e.g., to reduce an influence of heat produced by a main portion of a device and/or to increase an area over which measurements can be collected).

Heart rate monitor 342 can be configured to emit one or more lights and to include one or more photodiodes to collect reflected portions of the light. Troughs in a time series of an intensity of the collected light can be indicative of a heart beat. Thus, a set of times of heart beats can be collected and used to identify a heart rate.

Storage subsystem 304 can include a biometric monitor 327 that can access and process data from the biometric sensors. In some instances, biometric monitor 327 is configured to transform raw biometric-related measurements to physiologically relevant indicators. For example, a time series of light intensities collected at heart rate monitor 342 can be transformed into a heart rate. The biometric data (e.g., a heart rate, body temperature and/or blood oxygen level) can be used in evaluation of one or more wakefulness conditions to determine whether to infer that a user is awake.

Further, biometric data can be used by state detector 324 to identify whether wearable electronic device 300 is in a "worn" state indicating that it is being worn by a user. For example, it can be inferred that wearable electronic device 300 is being worn when a heart rate and/or blood oxygen level is detectable and/or when a biometric variable (e.g., heart rate, blood oxygen level and/or temperature) is within a physiological range.

It will be appreciated that wearable electronic device 300 is illustrative and that variations and modifications are possible. For example, in the depicted instance, wearable electronic device 300 lacks a motion co-processor, as included in the embodiment of electronic device 200 depicted in FIG. 2. However, it will be appreciated that, in some instances, wearable electronic device 300 can include a motion co-processor.

Further, while wearable electronic device 300 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including wearable electronic devices implemented using any combination of circuitry and software. It is also not required that every block in FIG. 3 be implemented in a given embodiment of a wearable electronic device.

Figure 4:
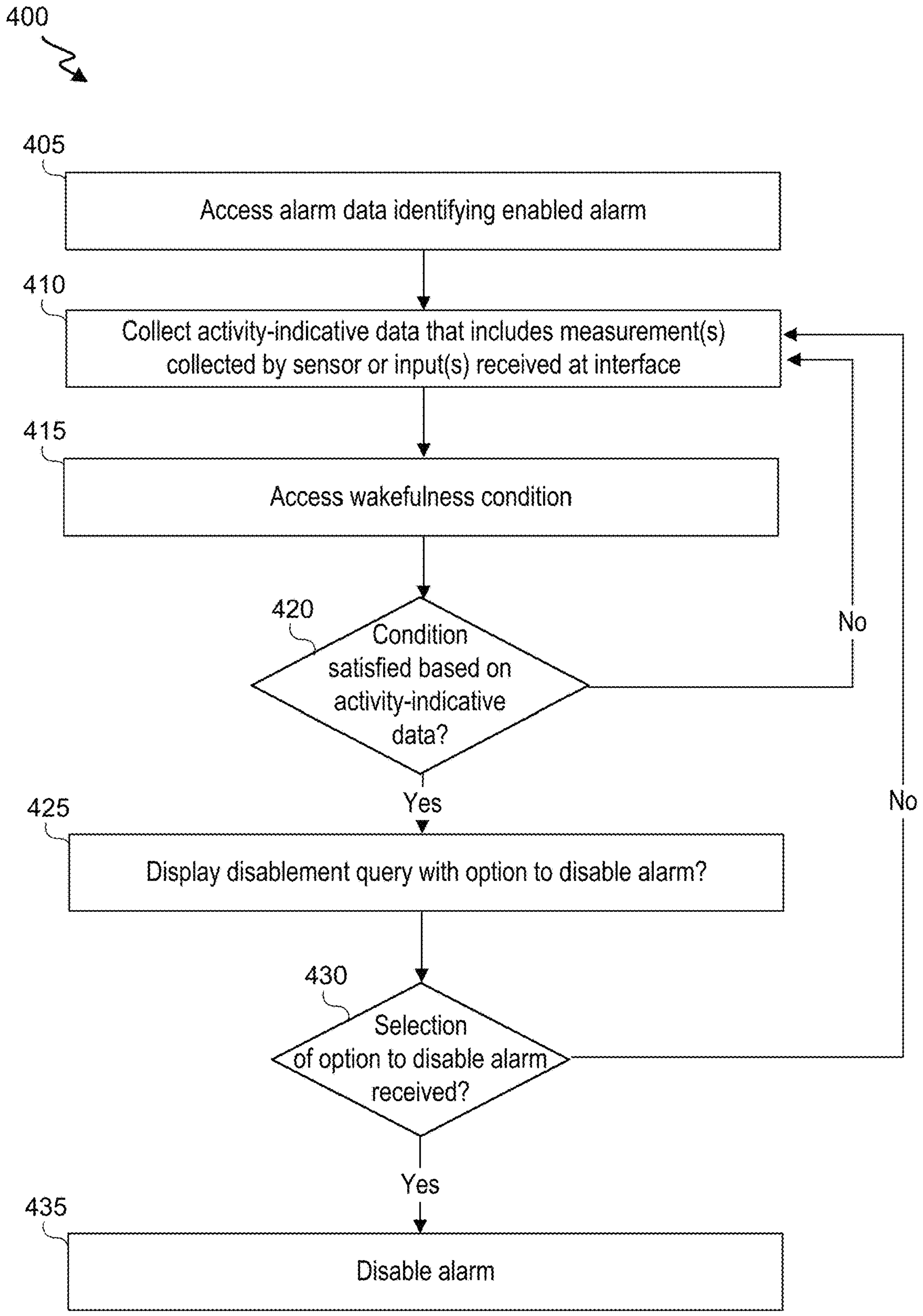
FIG. 4 shows a flowchart of a process for disabling an alarm in accordance with some embodiments of the invention.

FIG. 4 shows a flowchart of a process 400 for disabling an alarm in accordance with some embodiments of the invention. Part of all of process 400 can be performed, for example, at electronic device 200 and/or wearable electronic device 300.

Process 400 begins at block 405 where alarm data is accessed. The alarm data can correspond to an enabled alarm, indicating an alarm that is configured to trigger an output stimulus (e.g., audio and/or haptic stimulus) at one or more devices (e.g., at the device(s) performing all or part of process 400) at a preset alarm time. The alarm data can identify the preset alarm time. The preset alarm time can include a time as identified by a user via input when enabling or setting the alarm.

At block 410, activity-indicative data is collected. The activity-indicative data can include one or more measurements collected by a sensor of an electronic device performing all or part of process 400. The activity-indicative data can include one or more inputs received at an interface of the electronic device. The one or more inputs can correspond to an interaction with an application installed on the electronic device (which, in some instances, can include an operating system). The one or more inputs can alternatively or additionally correspond to other device interactions (e.g., providing a mechanical input to the device, pressing a button on the device and/or unplugging the device). Thus, the activity-indicative data can include data detected using one or more environmental sensors, input components and/or software modules. For example, one or more environmental sensors (e.g., an accelerometer, gyroscope, magnetometer, barometric sensor and/or GPS receiver) can collect data indicative of (for example) an acceleration, velocity, orientation, angular velocity, angular acceleration, altitude, location and/or position of the device. In some instances, the sensor data can be transformed into other types of movement data, such as a timing and/or count of steps. Other types of sensor data can include an ambient light level and/or indication as to whether the device is proximate to another object. The one or more inputs can be indicative of (for example) a type, duration and/or effect on input received at the device. For example, the one or more inputs can include a passcode or biometric input that was received and effective to unlock the device. As another example, the or more inputs can correspond with time stamps that indicate that input has been received substantially continuously over a particular (measured) time period. Other types of data can also be collected, such as whether the device is plugged in and/or whether a recent change in a power source was detected. As another example, data from a sensor (e.g., accelerometer, gyroscope, magnetometer, barometric sensor and/or GPS receiver) can be collected across a period of time to determine (for example) a change in a variable (e.g., a change in a location, change in altitude or change in orientation) or a duration of an above-threshold sensor measurement (e.g., a time during which a total acceleration or total velocity or horizontal acceleration or horizontal velocity exceeds an acceleration or velocity threshold).

At block 415, one or more wakefulness conditions is accessed. One, more or all of the one or more wakefulness conditions can be (for example) predefined or defined at least in part based on a learning algorithm and past sensor and/or input data. The one or more wakefulness conditions can include one or more thresholds which can apply to (for example) measurements, changes in measurements, and/or one or more movement metrics (e.g., a number of steps and/or a duration that it is inferred that a user was in a particular pose) derived from one or more measurements and/or inputs.

For example, a wakefulness condition can identify a threshold number of steps within a movement epoch, such that the wakefulness condition is satisfied upon detecting at least the threshold number of steps within the movement epoch. The wakefulness condition can indicate that a movement epoch is to be defined (for example) as a time period during which a moving average of a velocity of a device is above another threshold or as a time period of predetermined length (e.g., such that a device can potentially repeatedly determine a number of steps detected over a last time interval of the predetermined length). As another example, a wakefulness condition can be configured to be satisfied upon detecting a particular type of orientation change (e.g., transitioning from a first orientation that is within a first range of a horizontal orientation to a second orientation that is within a second range of a vertical orientation). As yet other examples, a wakefulness condition can be configured to be satisfied upon detecting that a power source for a device has changed (e.g., that a device has been disconnected from an AC power source), that a device has been unlocked, that a device has changed to a state indicating that it is being worn by a user and/or that an ambient light intensity has increased by at least a threshold amount within a defined time period.

At block 420, it is determined whether any of the one or more wakefulness conditions are satisfied based on the activity-indicative data. When none of the one or more wakefulness conditions are satisfied, process 400 returns to block 410. When at least one of the one or more wakefulness conditions are satisfied, process 400 continues to block 425, where a disablement query is displayed that includes an option to disable the alarm. The disablement query can identify the alarm (e.g., via the alarm time). The option can include, for example, displayed text and an associated selection option (e.g., toggle button, virtual button, indication that a mechanical input corresponds to selection of the option, etc.). In some instances, the disablement query further includes another option to decline disabling the alarm. For example, a presentation can include two virtual buttons corresponding to "Turn off alarm" and "Keep alarm" text. As another example, a presentation can include a slider or toggle feature, where moving a marker to one side corresponds to an instruction to disable the alarm and moving the marker to the other side corresponds to an instruction to maintain the alarm. In some instances, at least part of or all of the presentation of the disablement query is accompanied by or preceded by an audio and/or haptic stimulus.

At block 430, it is determined whether the option to disable the alarm was selected. Selecting the option may include, for example, toggling a toggle switch, pressing a virtual button, swiping a virtual object in a particular direction, etc. Selection of the option can correspond to generating an instruction to disable the alarm. In some instances, the determination can include whether the option was selected within a predefined time period from a time at which the query was presented.

When a disablement instruction was not received in response to the query (e.g., when no response was received or a response was received indicating that the alarm is not to be disabled), process 400 can return to block 410 to collect additional activity-indicative data for continued evaluation. In some instances, a pause for specified time is implemented prior to a return to block 410. In some instances, condition evaluation can cease in response to an express negative response to the query. When a selection of the option to disable the alarm is received, process 400 proceeds to block 435 where the alarm is disabled. Disabling the alarm can have an effect of not causing an audio and/or haptic stimulus to be presented at the alarm time.

It will be appreciated that variations of process 400 are contemplated. For example, process 400 may further including receiving (e.g., as a pushed transmission or in response to a request) other data from another electronic device associated with the user, and a condition may be evaluated based on at least part of the received data and at least part of the locally collected data. As another example, multiple conditions may be accessed and evaluated, and each may be associated with a different wakefulness confidence. To illustrate, detecting that input has been received to unlock a device (thereby satisfying a first condition) may be associated with a higher wakefulness confidence than detecting that a device has moved at least a threshold distance (thereby satisfying a second condition). The confidence can be used to (for example) identify a type of disablement query to be presented, determine whether to present a disablement query (e.g., where satisfaction of wakefulness conditions associated with high confidence can trigger automatic alarm disablement), a monitoring period, etc.

In some instances, multiple alarms may initially be enabled. In such instances, when it is determined that a wakefulness condition is satisfied, one or more disablement queries may be presented that includes one or more options to disable specific alarms and/or all of the alarms. For example, a disablement query may include "Disable alarms?", followed by an identification of a 7:30 am alarm, 8:00 am alarm, 8:15 am alarm, and all alarms—each being visually associated with a disablement option.

In some instances, alarms enabled on a device can be associated with one or more classifications. The one or more classifications can include a wake-alarm classification that indicates that the alarm is being used to wake a user up. The one or more classifications can include one or more other classifications that indicates that the alarm is being used for another purpose (e.g., as a task reminder). A classification can be determined based on (for example) which application was used to enable (or set) the alarm, a classification input that indicates that the alarm is a wake-alarm classification, and/or based on other data (e.g., such that an alarm is assigned a wake-alarm classification when biometric data indicates that a user is asleep a predefined time period before the preset alarm time). Evaluation of wakefulness conditions, presentations of disablement queries and/or disabling of alarms may be selectively performed for alarms that are assigned a wake-alarm classification.

Figure 5:
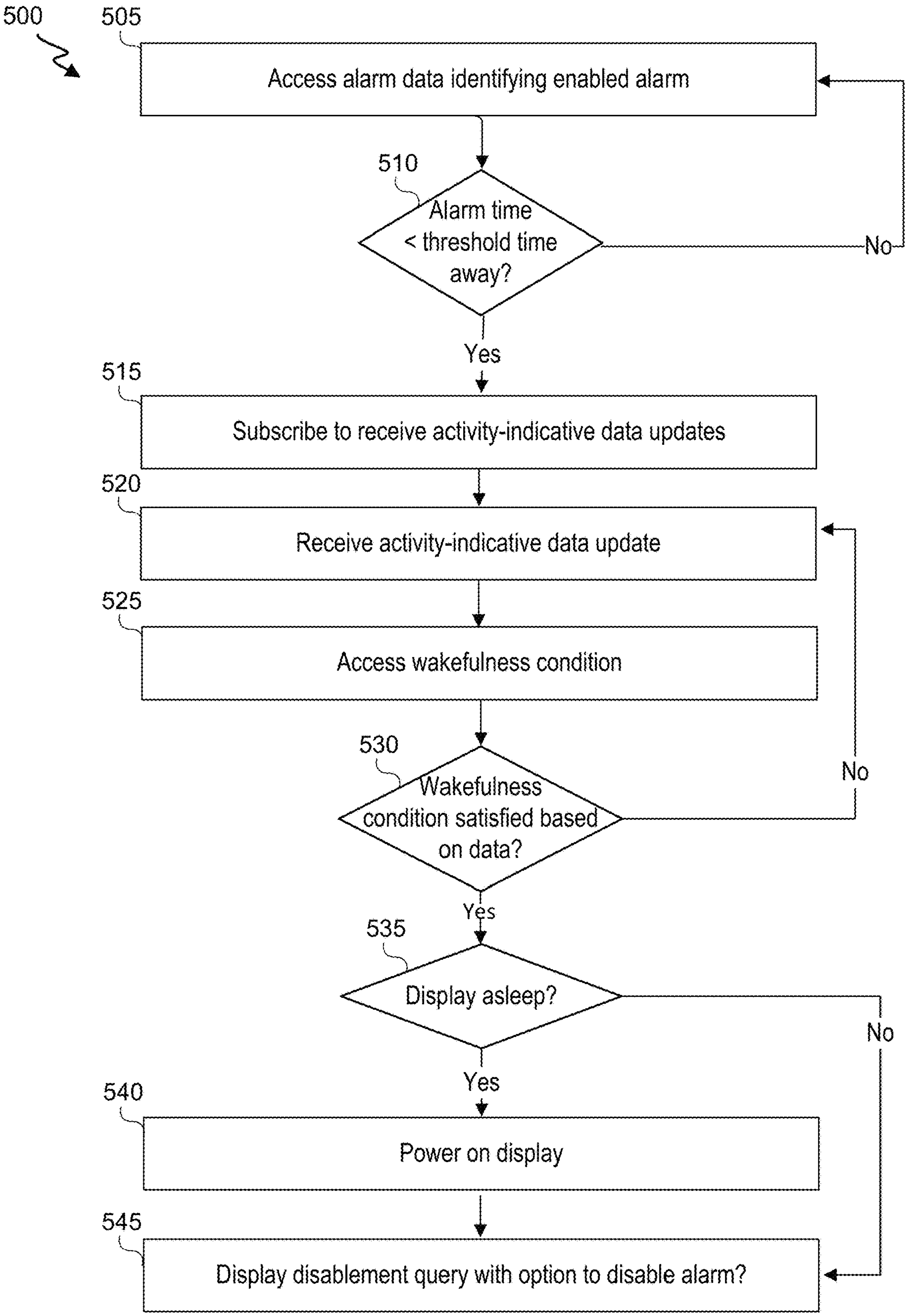
FIG. 5 shows a flowchart of a process for facilitating disabling an alarm in accordance with some embodiments of the invention.

FIG. 5 shows a flowchart of a process 500 for facilitating disabling an alarm in accordance with some embodiments of the invention. Part of all of process 500 can be performed, for example, at electronic device 200 and/or wearable electronic device 300.

Process 500 begins at block 505 where alarm data is accessed. The alarm data can correspond to an enabled alarm, indicating an alarm that is configured to trigger an output stimulus (e.g., audio and/or haptic stimulus) at one or more devices (e.g., at the device(s) performing all or part of process 400) at a particular alarm time. The alarm data can identify the particular alarm time.

At block 510, it is determined whether the alarm time is less than a threshold time away relative to a current time. For example, block 510 can be affirmatively determined when the threshold time is set to two hours, the alarm time is set to 6 am, and a current time is 4 am. The threshold time can be a predefined time. In some instances, it may further or alternatively be determined whether a current time is more than another predefined threshold time from a user-designated bedtime (e.g., as stored at the device) and/or a time at which it was inferred that the user went to bed (e.g., based on detecting that a device has been plugged in, that a device has been taken off from being worn, that movement has not been detected for at least a threshold time period within a predefined time range, etc.).

When it is determined that the alarm time is not less than the threshold time away relative to a current time, process 500 can return to block 505. In some instances, a pause of a predefined duration can be effected before returning to block 505. When it is determined that the alarm time is less than the threshold time away relative to a current time, process 500 proceeds to block 515, where an alarm controller subscribes to receive updates to activity-indicative data. The activity-indicative data can include data collected by one or more sensors and/or inputs received via an interface. The activity-indicative data can be indicative of and/or can correspond to movement data and/or interaction data. The movement data can characterize a movement or motion of the device. The movement data can include, for example, accelerometer data, gyroscope data, magnetometer data, barometric data and/or variables derived therefrom (e.g., step counts and/or pose positions). The interaction data can be indicative of and/or can correspond to an interaction with an application executing on the device. As one example, the alarm controller can subscribe to receive sensor measurement updates from a movement controller. Such updates can be sent (for example) in a streaming fashion, periodically, at routine intervals, as requested, upon detecting an input (e.g., generally, of a specific type or associated with a particular app or module), etc.

At block 520, updated (e.g., recent) activity-indicative data is received. At block 525, each of one or more wakefulness conditions is accessed (e.g., from a data store). The one or more wakefulness conditions can include (for example) predefined, learned, static and/or dynamic conditions. At block 530, it is determined whether any of the one or more wakefulness conditions is satisfied based on the updated activity-indicative data. When it is determined that none of the one or more wakefulness conditions is satisfied, process 500 returns to block 520 to receive newly updated activity-indicative data.

When it is determined that at least one of the one or more wakefulness conditions is satisfied, process 500 proceeds to block 535 where it is determined whether a display of the device is asleep. When it is determined that the display is asleep, process 500 proceeds to block 540 where the display is powered on. When it is determined that the display is not asleep, process 500 proceeds to block 545. At block 545, a disablement query is presented that includes an option to disable the alarm.

It will be appreciated that block 545 in process 500 can parallel block 425 in process 400 and that process 500 can further proceed as in process 400 to respond to an instruction (or lack thereof) received in response to the query.

Process 500 can be effected such that updates to activity-indicative data are received at block 520 even when a device is asleep (e.g., via use of a motion co-processor). This type of background processing can facilitate efficient and unobtrusive yet continuously monitoring to facilitate negating presentation of unnecessary alarm stimuli.

Figure 6:
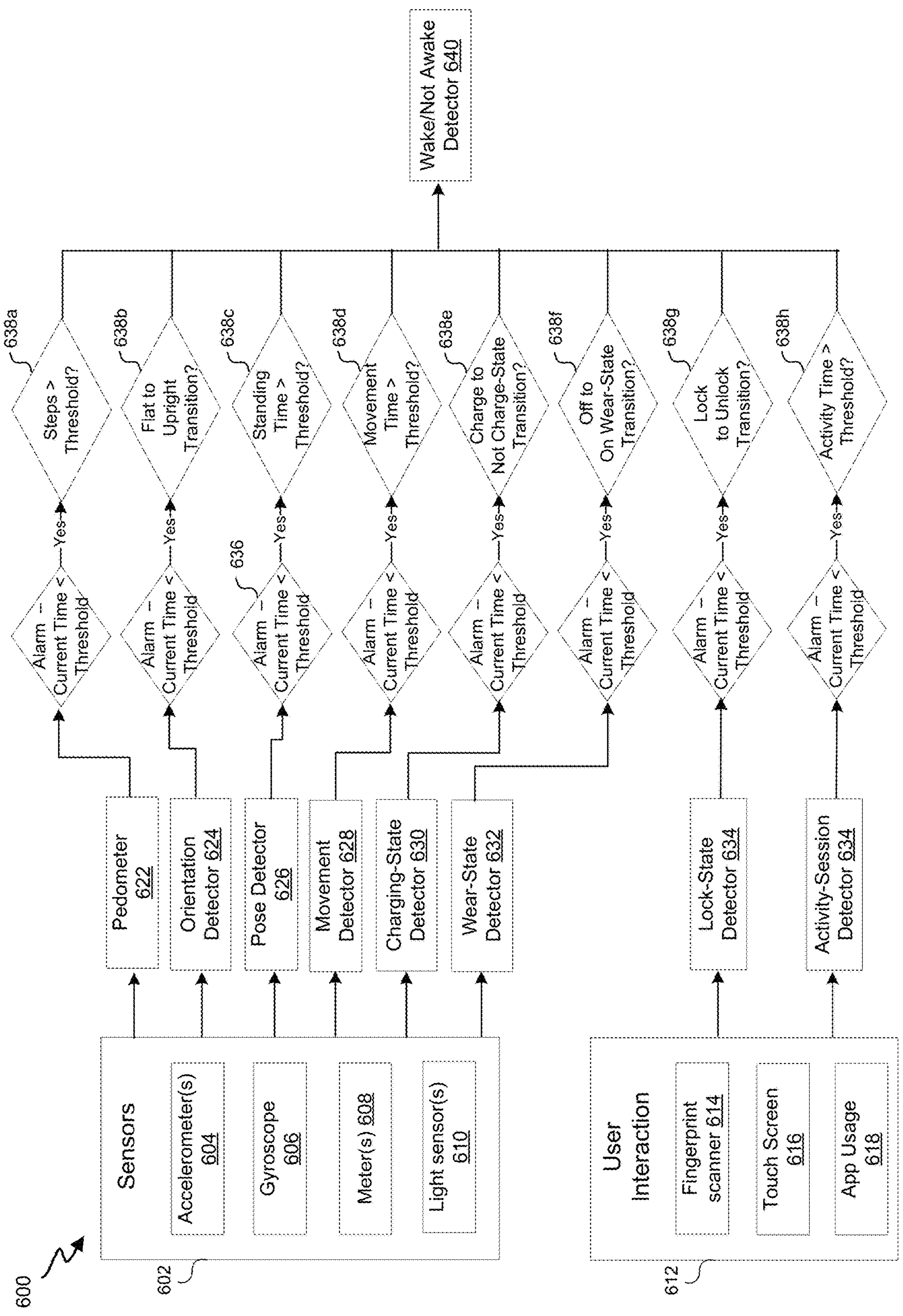
FIG. 6 shows a flow of a process for evaluating a wakefulness condition in accordance with some embodiments of the invention In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

FIG. 6 shows a flow of a process 600 for evaluating a wakefulness condition in accordance with some embodiments of the invention. Part of all of process 600 can be performed, for example, at electronic device 200 and/or wearable electronic device 300. In some instances, some or all actions of process 600 can be performed as part of the determination performed at block 420 in process 400 and/or as part of the determination performed at block 530 in process 500.

One or more sensors 602 collect sensor data. Sensors 602 can include one or more movement-, location-, position-, and/or orientation-detection sensors, such as an accelerometer 604, a gyroscope 606 and/or one or more meters 608 (e.g., a magnetometer, such as a compass). A meter 608 may further or alternatively include an ammeter to measure current. Sensors 602 can further include one or more light sensors 610, which can be used to detect ambient light. In some instances, a light sensor 610 includes a sensor to detect infrared light and/or intensity of light in response to emitting the light. Light sensor 610 may (for example) be part of a heart-rate detector.

The electronic device can further include one or more user-interaction detectors 612 configured to detect a user interaction with the device. A fingerprint scanner 614 can detect a finger on a fingerprint sensor and/or can detect that fingerprint data received at the fingerprint sensor corresponds to a particular fingerprint signature. A touch screen 616 can include (for example) resistive and/or capacitive elements to detect pressure and/or voltage changes. Thus, it can be determined whether a user is touching a screen and a part of the screen that is being touched. An app-usage detector 618 can track which (if any) app(s) are being used.

Data collected by one or more sensors 602 and/or one or more user-interaction detectors 612 can be used to determine or infer activity- and/or state-related information. For example, a pedometer 622 may use data from (for example) accelerometer 604 and/or gyroscope 606 to infer when a user has taken a step (e.g., and count steps). An orientation detector 624 can use data from (for example) accelerometer 604 and/or gyroscope 606 to infer an orientation of the device (e.g., with respect to one or more axes). A pose detector 626 can infer a pose of a user (e.g., laying down, sitting or standing) using data from (for example) accelerometer 604, gyroscope 606 and/or meter 608 (e.g., a magnetometer). A movement detector 628 can infer a magnitude, direction and/or duration of movement using data from (for example) accelerometer 604. Charging-state detector 630 can use data from (for example) meter 608 (e.g., an ammeter) to determine whether the device is plugged into an AC power source. A wear-state detector 632 can use data from (for example) light sensor 610 to infer whether the device is being worn by a user (e.g., based on whether a heart rate can be detected using collected light intensities).

A lock-state detector 634 can use data from (for example) fingerprint scanner 614 and/or touch screen 616 to determine whether the device has been or is to be unlocked (e.g., in response to detected fingerprint data or passcode data that matches an unlocking signature). An activity-session detector 634 can use data from (for example) touch screen 616 and/or app-usage detector 618 to infer (for example) whether a user is interacting with the device (e.g., generally, across all apps and/or across one or more specific apps) and/or a time interval over which a user has been interacting with the device.

At block 636, it can be determined whether a difference between a time at which an alarm on the device is set and a current time is less than (or less than or equal to) a predefined threshold (e.g., 30 minutes). If not, data can continued to be collected and the detectors can continue to detect and/or infer activity-related information. If so, one or more potential-disablement conditions 638*a*-638*h* can be evaluated. For example, at block 638*a* it can be determined whether a number of steps (e.g., within a movement epoch and/or time period) exceeds a predefined threshold. At block 638*b*, it can be determined whether inferred device-orientation data indicates that a device transitioned from a flat or horizontal orientation to an upright or vertical orientation. At block 638*c*, it can be determined whether inferred pose data indicates that a user has been standing for at least a predefined threshold amount of time. At block 638*d*, it can be determined whether at least a predefined threshold amount of movement was detected (e.g., corresponding to a velocity statistic, displacement statistic, etc.). At block 638*e*, it can be determined whether charging-state data indicates that the device has transitioned from a charging state to a non-charging state (i.e., whether the device has been unplugged). At block 638*f*, it can be determined whether the device has transitioned from a state indicating that it was not being worn by a user to a state indicating that it was being worn by a user. At block 638*g*, it can be determined whether the device has transitioned from a locked state to an unlocked state. At block 638*h*, it can be determined whether activity data indicates that the user has been interacting with the device for at least a predefined amount of time.

A wake/sleep detector 640 can infer whether a user is awake or not based on evaluation of one or more of conditions 638*a*-638*h*. A determination that the user is not awake may correspond to the user being asleep or the user being only temporarily awake during a night's sleep. In some instances, if any of conditions 638*a*-638*h* is satisfied, it can be inferred that the user is awake. In some instances, at least a predefined number of conditions 638*a*-638*h* are to be satisfied in order to infer that the user is awake. In some instances, some conditions are paired (e.g., such that detecting only that condition 638*c* is satisfied is to trigger an awake inference, while for condition 638*f*, at least one other condition is to also be satisfied to support an awake inference). It will be appreciated that conditions 638*a-h* are exemplary. One or more other conditions may be assessed in addition to and/or instead of the depicted condition, and the condition set need not include each of conditions 638*a-h*. If it is determined that a user is awake, a disablement query can then be presented. If it is determined that a user is not awake, a disablement query is not presented (e.g., not immediately presented).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. An electronic device comprising:
one or more data processors; and
a non-transitory computer readable storage medium containing instructions which, when executed on the one or more data processors, cause the one or more data processors to perform actions including:
accessing alarm data that indicates that an alarm is enabled to present an alarm stimulus at a preset alarm time; and
prior to the preset alarm time:
collecting activity-indicative data that includes:
one or more measurements collected by a sensor of the electronic device; or
one or more inputs received at an interface of the electronic device;
accessing a set of wakefulness conditions, wherein each wakefulness condition of the set of wakefulness conditions: (i) is configured to be satisfied when the activity-indicative data has one or more characteristics that are specified in the wakefulness condition; and (ii) is associated with a confidence value that corresponds to a predicted likelihood of whether a user associated with the electronic device is awake;
determining, based on the activity-indicative data, that a first wakefulness condition of the set of wakefulness conditions is satisfied, wherein the determination that the first wakefulness condition is satisfied is performed at the electronic device;
in response to the determination that the first wakefulness condition is satisfied, accessing a first confidence value associated with the first wakefulness condition;
determining that the first confidence value indicates an increased likelihood that the user is awake; and
disabling, based at least in part on the first confidence value indicating the increased likelihood of the user being awake, the alarm such that the alarm stimulus is not to be presented at the preset alarm time.

2. The electronic device of claim 1, wherein disabling the alarm further includes:
identifying a disablement query corresponding to a particular disablement-query type, wherein the disablement query includes an option to disable the alarm, and wherein the particular disablement-query type is associated with the first wakefulness condition;
displaying the disablement query corresponding to the particular disablement-query type;
detecting a selection, responsive to the disablement query, of the option to disable the alarm; and
in response to receipt of the selection, disabling the alarm such that the alarm stimulus is not to be presented at the preset alarm time.

3. The electronic device of claim 1, wherein disabling the alarm further includes:
determining, based at least in part on the first confidence value, that a disablement query is to be presented to the user, wherein the disablement query includes an option to disable the alarm;
in response to determining that the disablement query is to be presented to the user, displaying the disablement query;
detecting a selection, responsive to the disablement query, of the option to disable the alarm; and
in response to receipt of the selection, disabling the alarm such that the alarm stimulus is not to be presented at the preset alarm time.

4. The electronic device of claim 1, wherein disabling the alarm further includes:
determining, based at least in part on the first confidence value, a time period during which the activity-indicative data continues to be collected.

5. The electronic device of claim 1, wherein the instructions further cause the one or more data processors to perform actions including:

determining, based on the activity-indicative data, that a second wakefulness condition of the set of wakefulness conditions is satisfied, wherein the determination that the second wakefulness condition is satisfied is performed at the electronic device;

in response to the determination that the first wakefulness condition is satisfied, accessing a second confidence value associated with the second wakefulness condition, wherein the second confidence value is greater than the first confidence value; and disabling, based at least in part on the first and second confidence values, the alarm such that the alarm stimulus is not to be presented at the preset alarm time, wherein the alarm is automatically disabled without displaying a disablement query on the electronic device.

6. The electronic device of claim 5, wherein:

the activity-indicative data includes the one or more measurements collected by the sensor of the electronic device and the one or more inputs;

the first wakefulness condition is associated with the one or more measurements collected by the sensor of the electronic device, wherein the one or more measurements characterize a movement of the electronic device; and the second wakefulness condition is associated with the one or more inputs, wherein the one or more inputs further include a biometric input or passcode input that triggers an unlocking of the electronic device.

7. The electronic device of claim 1, wherein:

the activity-indicative data includes the one or more measurements collected by the sensor of the electronic device;

the one or more measurements characterize a movement of the electronic device; and determining that the first wakefulness condition is satisfied includes:

identifying a movement metric based on the one or more measurements; and determining that the movement metric exceeds a predefined threshold.

8. A computer-program product tangibly embodied in a non-transitory machine-readable storage medium, including instructions configured to cause one or more data processors to perform actions including:

accessing alarm data that indicates that an alarm is enabled to present an alarm stimulus at a preset alarm time; and prior to the preset alarm time:

collecting activity-indicative data that includes:

one or more measurements collected by a sensor of an electronic device; or one or more inputs received at an interface of the electronic device;

accessing a set of wakefulness conditions, wherein each wakefulness condition of the set of wakefulness conditions: (i) is configured to be satisfied when the activity-indicative data has one or more characteristics that are specified in the wakefulness condition; and (ii) is associated with a confidence value that corresponds to a predicted likelihood of whether a user associated with the electronic device is awake;

determining, based on the activity-indicative data, that a first wakefulness condition of the set of wakefulness conditions is satisfied, wherein the determination that the first wakefulness condition is satisfied is performed at the electronic device;

in response to the determination that the first wakefulness condition is satisfied, accessing a first confidence value associated with the first wakefulness condition;

determining that the first confidence value indicates an increased likelihood that the user is awake; and disabling, based at least in part on the first confidence value indicating the increased likelihood of the user being awake, the alarm such that the alarm stimulus is not to be presented at the preset alarm time.

9. The computer-program product of claim 8, wherein disabling the alarm further includes:

identifying a disablement query corresponding to a particular disablement-query type, wherein the disablement query includes an option to disable the alarm, and wherein the particular disablement-query type is associated with the first wakefulness condition;

displaying the disablement query corresponding to the particular disablement-query type, detecting a selection, responsive to the disablement query, of the option to disable the alarm; and in response to receipt of the selection, disabling the alarm such that the alarm stimulus is not to be presented at the preset alarm time.

10. The computer-program product of claim 8, wherein disabling the alarm further includes:

determining, based at least in part on the first confidence value, that a disablement query is to be presented to the user, wherein the disablement query includes an option to disable the alarm;

in response to determining that the disablement query is to be presented to the user, displaying the disablement query;

detecting a selection, responsive to the disablement query, of the option to disable the alarm; and in response to receipt of the selection, disabling the alarm such that the alarm stimulus is not to be presented at the preset alarm time.

11. The computer-program product of claim 8, wherein disabling the alarm further includes:

determining, based at least in part on the first confidence value, a time period during which the activity-indicative data continues to be collected.

12. The computer-program product of claim 8, wherein the instructions are configured to further cause one or more data processors to perform actions including:

determining, based on the activity-indicative data, that a second wakefulness condition of the set of wakefulness conditions is satisfied, wherein the determination that the second wakefulness condition is satisfied is performed at the electronic device;

in response to the determination that the first wakefulness condition is satisfied, accessing a second confidence value associated with the second wakefulness condition, wherein the second confidence value is greater than the first confidence value; and disabling, based at least in part on the first and second confidence values, the alarm such that the alarm stimulus is not to be presented at the preset alarm time, wherein the alarm is automatically disabled without displaying a disablement query on the electronic device.

13. The computer-program product of claim 12, wherein:

the activity-indicative data includes the one or more measurements collected by the sensor of the electronic device and the one or more inputs;

the first wakefulness condition is associated with the one or more measurements collected by the sensor of the electronic device, wherein the one or more measurements characterize a movement of the electronic device; and the second wakefulness condition is associated with the one or more inputs, wherein the one or more inputs further include a biometric input or passcode input that triggers an unlocking of the electronic device.

14. The computer-program product of claim 8, wherein the activity-indicative data includes the one or more measurements collected by the sensor of the electronic device, the sensor including an accelerometer, magnetometer, barometric sensor or gyroscope;

determining that the first wakefulness condition is satisfied includes:

estimating a step count based on the one or more measurements; and determining that the step count exceeds a predefined threshold.

15. A computer-implemented method comprising:

accessing alarm data that indicates that an alarm is enabled to present an alarm stimulus at a preset alarm time; and prior to the preset alarm time:

collecting activity-indicative data that includes:

one or more measurements collected by a sensor of an electronic device; or one or more inputs received at an interface of the electronic device;

accessing a set of wakefulness conditions, wherein each wakefulness condition of the set of wakefulness conditions: (i) is configured to be satisfied when the activity-indicative data has one or more characteristics that are specified in the wakefulness condition; and (ii) is associated with a confidence value that corresponds to a predicted likelihood of whether a user associated with the electronic device is awake;

determining, based on the activity-indicative data, that a first wakefulness condition of the set of wakefulness conditions is satisfied, wherein the determination that the first wakefulness condition is satisfied is performed at the electronic device;

in response to the determination that the first wakefulness condition is satisfied, accessing a first confidence value associated with the first wakefulness condition;

determining that the first confidence value indicates an increased likelihood that the user is awake; and disabling, based at least in part on the first confidence value indicating the increased likelihood of the user being awake, the alarm such that the alarm stimulus is not to be presented at the preset alarm time.

16. The computer-implemented method of claim 15, wherein disabling the alarm further includes:

identifying a disablement query corresponding to a particular disablement-query type, wherein the disablement query includes an option to disable the alarm, and wherein the particular disablement-query type is associated with the first wakefulness condition;

displaying the disablement query corresponding to the particular disablement-query type;

detecting a selection, responsive to the disablement query, of the option to disable the alarm; and in response to receipt of the selection, disabling the alarm such that the alarm stimulus is not to be presented at the preset alarm time.

17. The computer-implemented method of claim 15, wherein disabling the alarm further includes:

determining, based at least in part on the first confidence value, that a disablement query is to be presented to the user, wherein the disablement query includes an option to disable the alarm;

in response to determining that the disablement query is to be presented to the user, displaying the disablement query;

detecting a selection, responsive to the disablement query, of the option to disable the alarm; and in response to receipt of the selection, disabling the alarm such that the alarm stimulus is not to be presented at the preset alarm time.

18. The computer-implemented method of claim 15, wherein disabling the alarm further includes:

determining, based at least in part on the first confidence value, a time period during which the activity-indicative data continues to be collected.

19. The computer-implemented method of claim 15, further comprising:

determining, based on the activity-indicative data, that a second wakefulness condition of the set of wakefulness conditions is satisfied, wherein the determination that the second wakefulness condition is satisfied is performed at the electronic device;

in response to the determination that the first wakefulness condition is satisfied, accessing a second confidence value associated with the second wakefulness condition, wherein the second confidence value is greater than the first confidence value; and disabling, based at least in part on the first and second confidence values, the alarm such that the alarm stimulus is not to be presented at the preset alarm time, wherein the alarm is automatically disabled without displaying a disablement query on the electronic device.

20. The computer-implemented method of claim 19, wherein:

the activity-indicative data includes the one or more measurements collected by the sensor of the electronic device and the one or more inputs;

the first wakefulness condition is associated with the one or more measurements collected by the sensor of the electronic device, wherein the one or more measurements characterize a movement of the electronic device; and the second wakefulness condition is associated with the one or more inputs, wherein the one or more inputs further include a biometric input or passcode input that triggers an unlocking of the electronic device.

* * * * *